US012664876B2

(12) United States Patent
Platner

(10) Patent No.: US 12,664,876 B2
(45) Date of Patent: Jun. 23, 2026

(54) LOCATION-INDICATING SMOKE DETECTION ARRANGEMENT

(71) Applicant: Corey Platner, Dallas, TX (US)

(72) Inventor: Corey Platner, Dallas, TX (US)

(*) Notice: Subject to any disclaimer, the term of this patent is extended or adjusted under 35 U.S.C. 154(b) by 123 days.

(21) Appl. No.: 18/603,904

(22) Filed: Mar. 13, 2024

(65) Prior Publication Data

US 2025/0292673 A1 Sep. 18, 2025

(51) Int. Cl.

| | |
|---|---|
| ***G08B 29/18*** | (2006.01) |
| ***G08B 7/06*** | (2006.01) |
| ***G08B 17/10*** | (2006.01) |
| ***G08B 29/14*** | (2006.01) |

(52) U.S. Cl.

CPC ......... *G08B 29/185* (2013.01); *G08B 29/145* (2013.01); *G08B 29/181* (2013.01); *G08B 7/06* (2013.01); *G08B 17/10* (2013.01)

(58) Field of Classification Search

CPC .. G08B 29/185; G08B 29/145; G08B 29/181; G08B 7/06; G08B 17/10

See application file for complete search history.

(56) References Cited

U.S. PATENT DOCUMENTS 5,905,438 A * 5/1999 Weiss .................. G08B 29/181 340/539.3
6,624,750 B1 * 9/2003 Marman ................ G08B 25/10 340/521
7,420,473 B2 * 9/2008 Eicken ............... G08B 21/0202 340/573.3
D608,671 S 1/2010 Treharne
7,701,355 B1 * 4/2010 Billman ................. G08B 7/066 340/627
7,714,734 B1 * 5/2010 Billman .................. G08B 5/38 340/627
7,719,433 B1 * 5/2010 Billman ................. G08B 17/10 340/627
7,889,088 B1 * 2/2011 Billman ................. G08B 25/10 340/627
8,258,969 B1 * 9/2012 Billman .................. G08B 3/10 340/627
8,618,942 B1 * 12/2013 Billman .................. A62B 3/00 340/627
9,514,633 B2 * 12/2016 McNutt .................. G08B 21/02
9,652,975 B1 * 5/2017 Riley ........................ G08B 1/08
9,666,042 B2 * 5/2017 Wedig .................. G08B 17/103
10,161,806 B2 * 12/2018 Lermann .................. G01K 1/12
10,497,251 B2 * 12/2019 McNutt ..................... G08B 5/36
10,667,115 B2 * 5/2020 Rubio Corredera ... G08B 7/066

(Continued)

FOREIGN PATENT DOCUMENTS

WO WO2013163515 10/2013

*Primary Examiner* — Hoi C Lau

(57) ABSTRACT

A location-indicating smoke detection arrangement includes a central control arrangement and a plurality of location-indicating smoke detection units, each of which includes a housing, a sensor, a light emitter, a reset switch, a battery, a processor, and a speaker designed to emit sounds, including an alarm sound, a low-battery sound, and a location message. The location message is emitted when the alarm sound or the low-battery sound is activated to inform persons of the room in which the location-indicating smoke detection arrangement is located.

16 Claims, 6 Drawing Sheets

(56) References Cited

U.S. PATENT DOCUMENTS

| | | | | |
|---|---|---|---|---|
| 2005/0083192 | A1* | 4/2005 | Kleven | G08B 25/001 340/506 |
| 2007/0222624 | A1* | 9/2007 | Eicken | G08B 7/06 340/573.3 |
| 2008/0266121 | A1* | 10/2008 | Ellul | G08B 7/066 340/584 |
| 2014/0191875 | A1* | 7/2014 | Wedig | G08B 17/103 340/628 |
| 2015/0065078 | A1* | 3/2015 | Mejia | G08B 17/00 455/404.1 |
| 2015/0100167 | A1* | 4/2015 | Sloo | H04L 67/54 700/278 |
| 2015/0118630 | A1* | 4/2015 | Ewell | A47J 31/525 432/32 |
| 2015/0187194 | A1* | 7/2015 | Hypolite | G08B 17/10 340/628 |
| 2016/0086481 | A1* | 3/2016 | McNutt | G08B 7/06 340/540 |
| 2017/0077693 | A1* | 3/2017 | Lermann | H01R 13/7137 |
| 2019/0122534 | A1* | 4/2019 | McNutt | G08B 5/36 |
| 2019/0258278 | A1* | 8/2019 | Zokaei | G08B 25/10 |
| 2021/0012638 | A1* | 1/2021 | Jalilian | G08B 21/20 |
| 2023/0125575 | A1* | 4/2023 | Oja | G08B 3/10 715/728 |
| 2024/0087437 | A1* | 3/2024 | Nowzari | G08B 17/103 |
| 2025/0292673 | A1* | 9/2025 | Platner | G08B 25/003 |

* cited by examiner

LOCATION-INDICATING SMOKE DETECTION ARRANGEMENT

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to smoke detectors and more particularly pertains to a new location-indicating smoke detection arrangement. Smoke detectors often are programmed with a low-battery sound that beeps to alert a user that the battery is low or dead and needs to be replaced. However, sometimes it can be difficult to follow that sound to the corresponding smoke detector, especially in large homes with multiple rooms and detector units or for persons with auditory impairment. In addition, in emergency situations where smoke, carbon monoxide, or other hazardous gases have been detected, it would be beneficial to persons inside a building to know where the alarm was detected so they can avoid that room as they exit the building, which would be especially useful for children, the elderly, and persons whose judgment is impaired in a high pressure or tense situation like a fire or similar.

(2) Description of Related Art Including Information Disclosed Under 37 CFR 1.97 and 1.98

The prior art relates to smoke detectors. The prior art, as best understood, does not disclose a smoke alarm system comprising multiple linked smoke detectors where the detectors have multiple alarms which can be set for different rooms, and a smoke detector with a manual switch to set the room location of the smoke detector.

(h) BRIEF SUMMARY OF THE INVENTION

An embodiment of the disclosure meets the needs presented above in a location-indicating smoke detection arrangement generally comprising a central control arrangement and a plurality of location-indicating smoke detection units, each of which includes a housing, a sensor, a light emitter, a reset switch, a battery, a processor, and a speaker designed to emit sounds, including an alarm sound, a low-battery sound, and a location message that is emitted when the alarm sound or the low-battery sound is activated to inform persons of the room in which the location-indicating smoke detection arrangement is located. The central control arrangement is operatively connected to the plurality of location-indicating smoke detection units to control the operation thereof. The housing is designed to be mounted to a wall or ceiling. The sensor is designed to detect smoke, carbon monoxide, or other hazardous gases. The light emitter is designed to emit a light to indicate an operating status. The reset switch is designed to test and reset the location-indicating smoke detection arrangement. The battery is designed to supply power. The processor is designed to process signals and activate components in response thereto. The speaker is designed to emit sounds, including an alarm sound, a low-battery sound, and a location message. The alarm sound is emitted when a hazardous condition is detected in the room in which the location-indicating smoke detection arrangement is located. The low-battery sound is emitted when the battery is low or dead.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
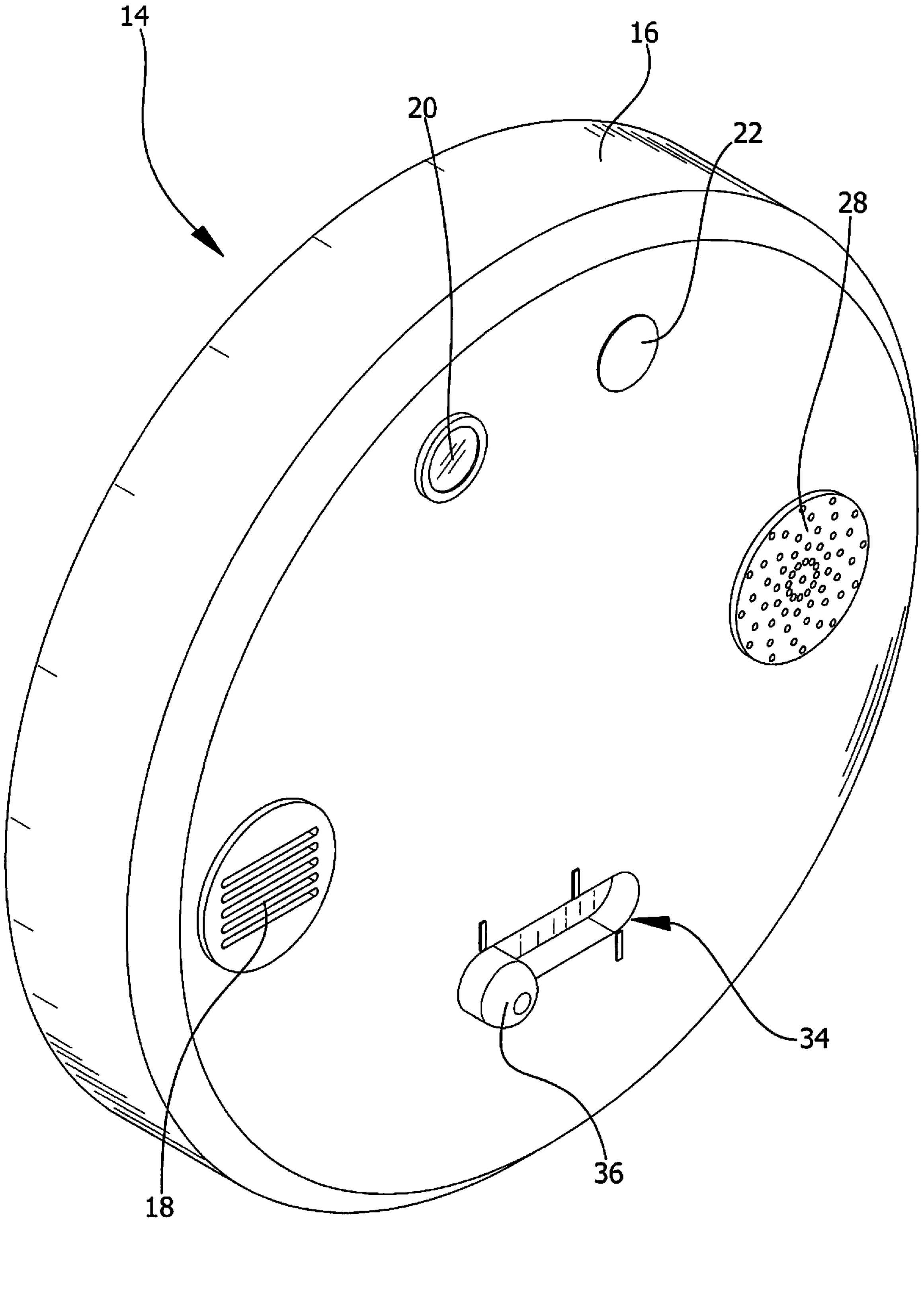
FIG. 1 is a front perspective view of a location-indicating smoke detection unit according to an embodiment of the disclosure.
Figure 2:
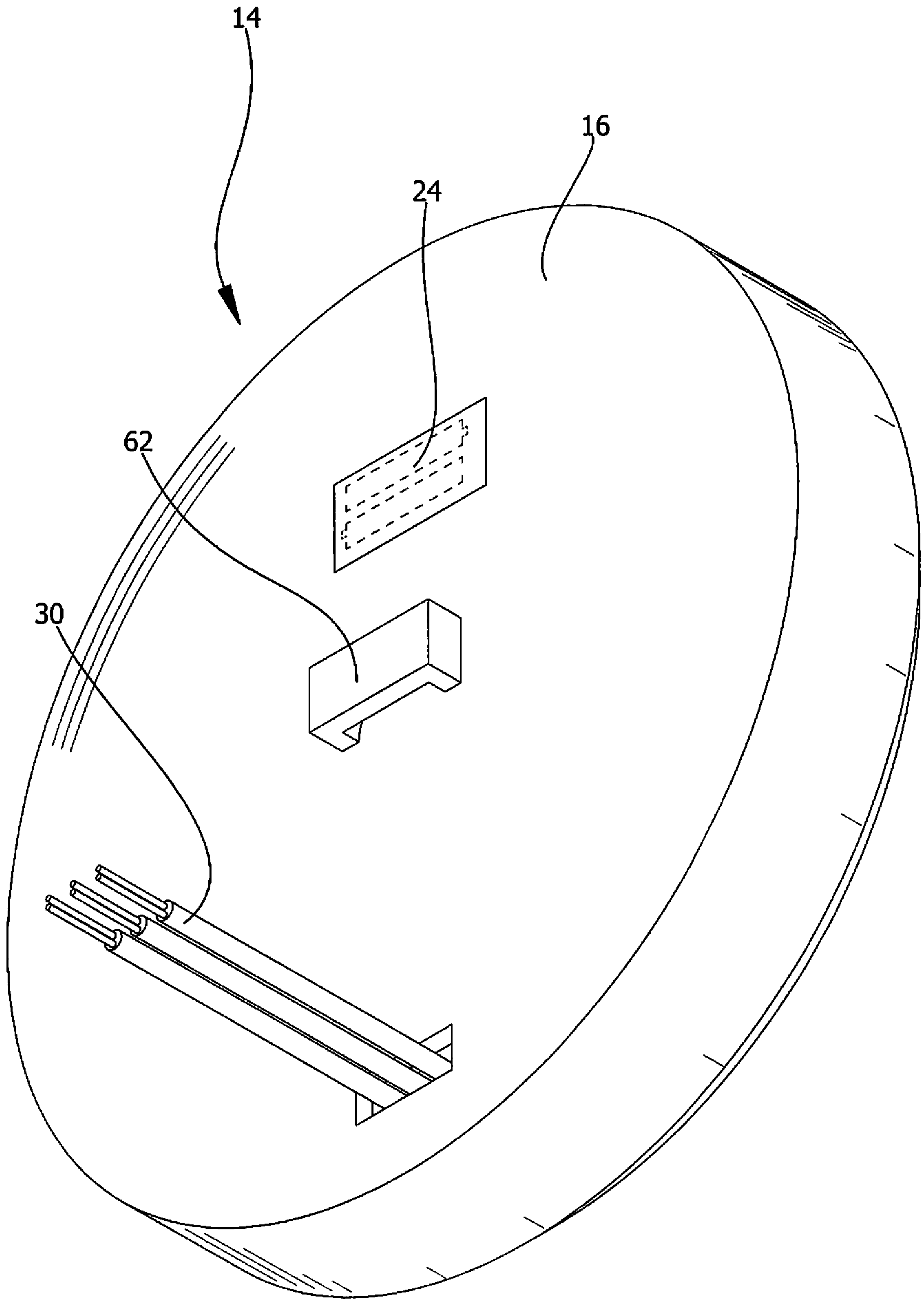
FIG. 2 is a rear perspective view of an embodiment of the disclosure.

With reference now to the drawings, and in particular to FIGS. 1 through 6 thereof, a new location-indicating smoke detection arrangement embodying the principles and concepts of an embodiment of the disclosure and generally designated by the reference numeral 10 will be described.

As best illustrated in FIGS. 1 through 6, the location-indicating smoke detection arrangement 10 generally comprises a central control arrangement 12 and a plurality of location-indicating smoke detection units 14, each of which includes a housing 16, a sensor 18, a light emitter 20, a reset switch 22, a battery 24, a processor 26, and a speaker 28 designed to emit sounds, including an alarm sound, a low-battery sound, and a location message that is emitted when the alarm sound or the low-battery sound is activated to inform persons of the room in which the location-indicating smoke detection arrangement 10 is located. The central control arrangement 12 is operatively connected to the plurality of location-indicating smoke detection units 14 to control the operation thereof. The housing 16 is designed to be mounted to a wall 60 or ceiling, such as by wall mount 62. The sensor 18 is designed to detect smoke, carbon monoxide, or other hazardous gases. The light emitter 20 is designed to emit a light to indicate an operating status. The reset switch 22 is designed to test and reset the location-indicating smoke detection arrangement 10. The battery 24 is designed to supply power. The processor 26 is designed to process signals and activate components in response thereto. The speaker 28 is designed to emit sounds, including an alarm sound, a low-battery sound, and a location message. The alarm sound is emitted when a hazardous condition is detected in the room in which the location-indicating smoke detection arrangement 10 is located. The low-battery sound is emitted when the battery 24 is low or dead.

In accordance with at least one possible embodiment, the central control arrangement 12 is programmable to permit a user to program in the different room locations for each of the plurality of location-indicating smoke detection units 14 such that each of the plurality of location-indicating smoke detection units 14 activates its corresponding location message when the alarm sound or the low-battery sound is activated.

In accordance with at least one possible embodiment, the central control arrangement 12 is designed to activate all location-indicating smoke detection units 14 to emit the same location message corresponding to an activated location-indicating smoke detection unit 14 to inform persons in any location of a building in which room the activated location-indicating smoke detection unit 14 is located. In other words, multiple location-indicating smoke detection units 14 can all be employed to communicate the message throughout the building of where the alarm or low battery is occurring. The central control arrangement 12 is designed to control the operation and activation of the location-indicating smoke detection units 14, either individually, in groups, or all at the same time. The central control arrangement 12 can also be designed to cause multiple location-indicating smoke detection units 14 to emit the same or different location messages, the same or different alarm sounds, and the same or different audiovisual alarm indicators, depending on the detected conditions present.

In accordance with at least one possible embodiment, the central control arrangement 12 is connected to the plurality of location-indicating smoke detection units 14 by a wired connection 30 and is designed to supply power via a power source 40 to the plurality of location-indicating smoke detection units 14, wherein the battery 24 supplies backup power. Alternatively, in accordance with at least one possible embodiment, the central control arrangement 12 is connected to the plurality of location-indicating smoke detection units 14 by a wireless connection.

Figure 5:
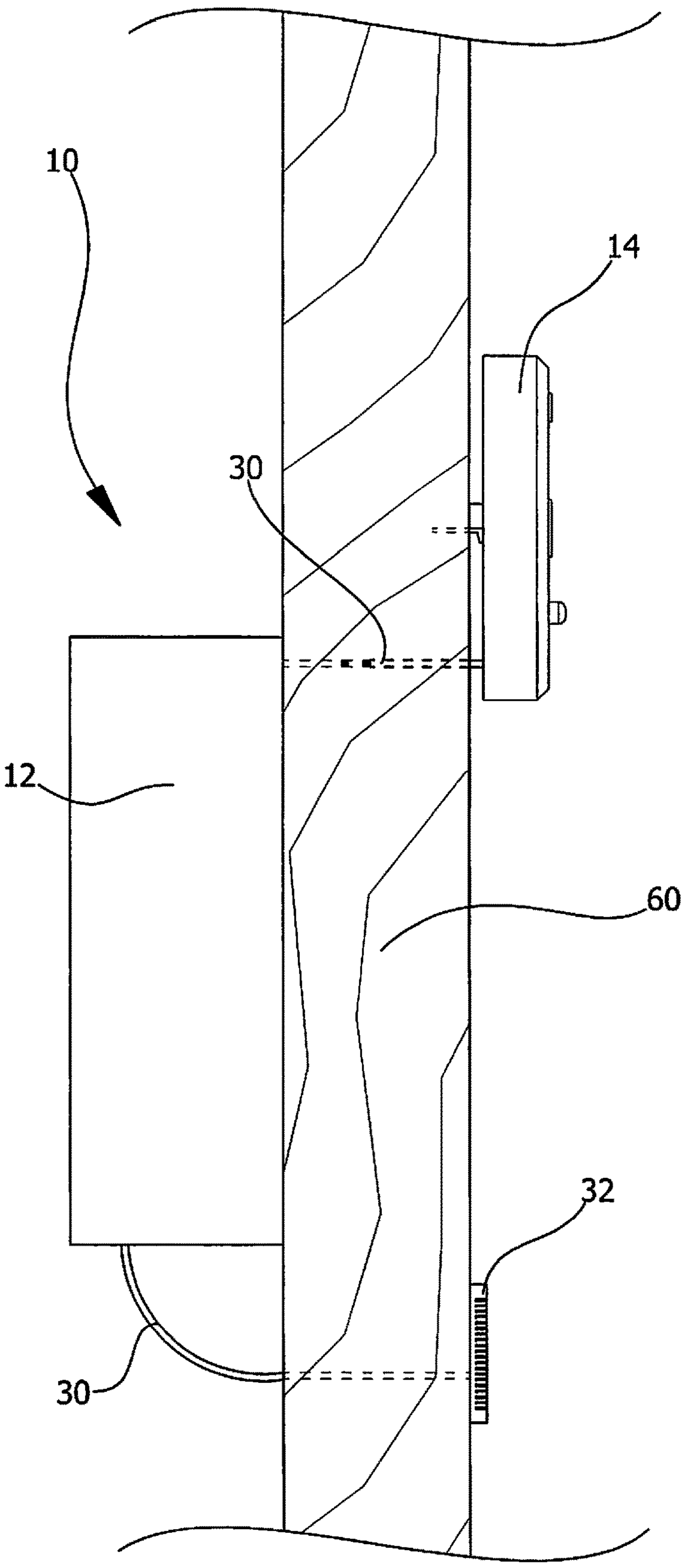
FIG. 5 is a side view of an embodiment of the disclosure in use.
Figure 6:
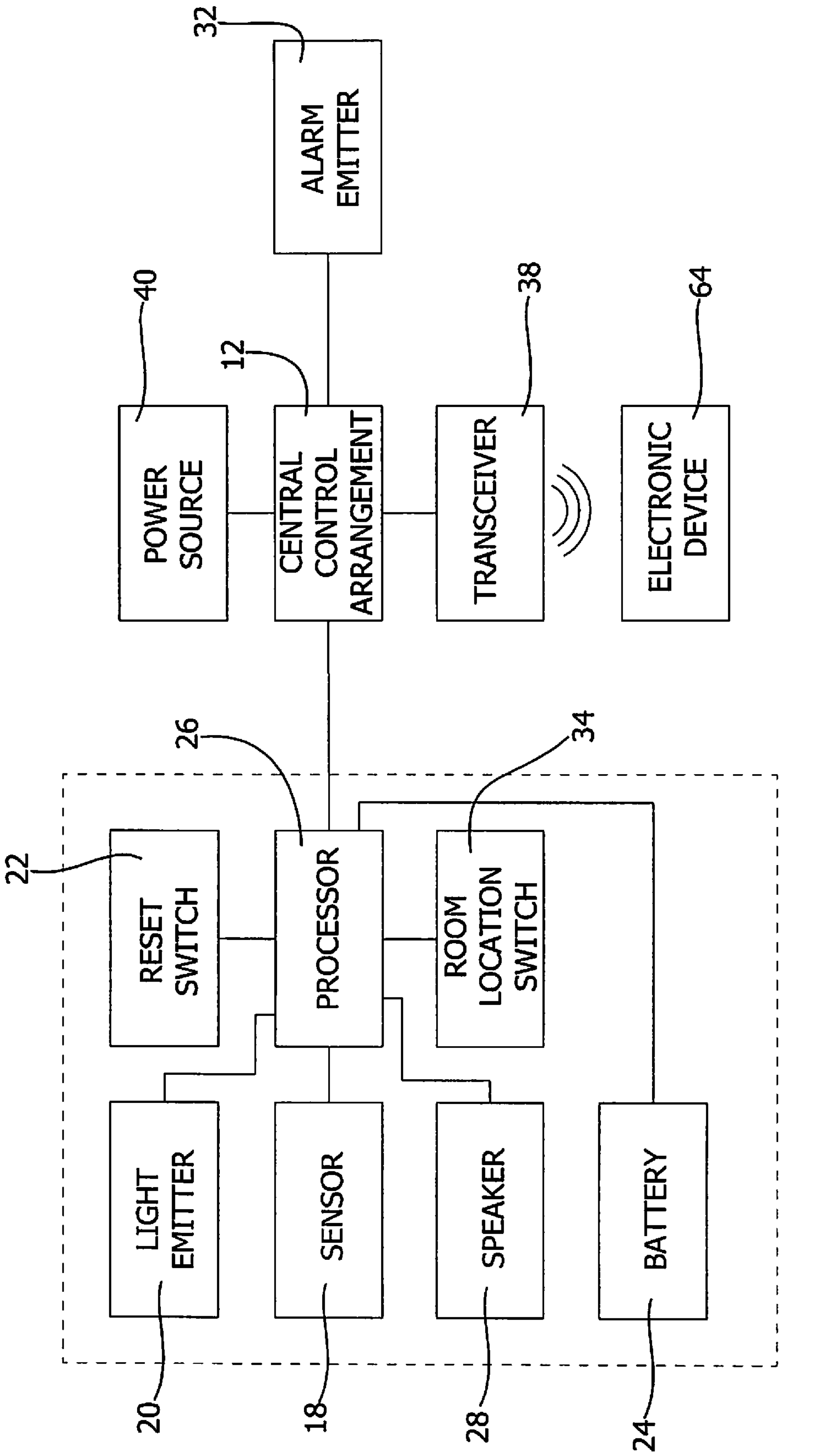
FIG. 6 is a diagrammatic view of an embodiment of the disclosure.

In accordance with at least one possible embodiment, the location-indicating smoke detection arrangement 10 further includes at least one alarm emitter 32 operatively connected to the central control arrangement 12 and designed to emit audiovisual alarm indicators including the alarm sound and the location message for persons in other rooms and persons with visual or auditory impairment. It should be noted that the alarm emitter 32 is depicted in FIG. 5 as being in the same room as the location-indicating smoke detection unit 14, but it is possible for the alarm emitter 32 to be located in another room.

In accordance with at least one possible embodiment, each of the plurality of location-indicating smoke detection units 14 further includes a room location switch 34 designed to be manually moved to select one of a plurality of common room types to program its corresponding location-indicating smoke detection unit 14 to emit the location message corresponding to the selected room type in the event of power failure or disconnection from the central control arrangement 12. In the embodiment shown in FIG. 1, the room location switch 34 is a slidable button 36 that can be moved to select common room types like "kitchen," "bedroom," and "living room."

In accordance with at least one possible embodiment, the speaker 28 is programmable to emit the low-battery sound at increasingly louder volumes over a period of time to ensure hearing by persons in other rooms or persons with auditory impairment.

In accordance with at least one possible embodiment, the central control arrangement 12 includes a wireless transceiver 38 to operatively connect the central control arrangement 12 to a mobile electronic device or smartphone 64 for both operation of the location-indicating smoke detection arrangement 10 and communication of information to persons.

In accordance with at least one possible embodiment, the light emitter 20 comprises a multi-color LED arrangement configured to be controlled by the central control arrangement 12 to emit lights of different colors at different intervals of time, such as solid red light or fast flashing white or red light to indicate an emergency situation, solid yellow light or slow flashing red light to indicate a malfunction or low battery, and solid green light to indicate a good operating condition. Other lighting configurations are within the scope of the disclosure.

In use, the location-indicating smoke detection units 14 detect smoke, carbon monoxide, and/or other hazardous gases. It should be noted that the location-indicating smoke detection units 14 can be used to detect one or more than one hazardous gas or smoke. The speaker 28 is then activated to emit the alarm sound and the location message. When a low battery 24 of one of the location-indicating smoke detection units 14 is detected, the speaker 28 is activated and emits the low-battery sound and the location message.

In accordance with at least one possible embodiment, users can program the central control arrangement 12 with the different room locations for each of the plurality of location-indicating smoke detection units 14 such that each of the plurality of location-indicating smoke detection units 14 activates its corresponding location message when the alarm sound or the low-battery sound is activated. In accordance with at least one possible embodiment, users can also use a mobile electronic device or smartphone for both operation of the location-indicating smoke detection arrangement 10 and communication of information to persons.

Figure 3:
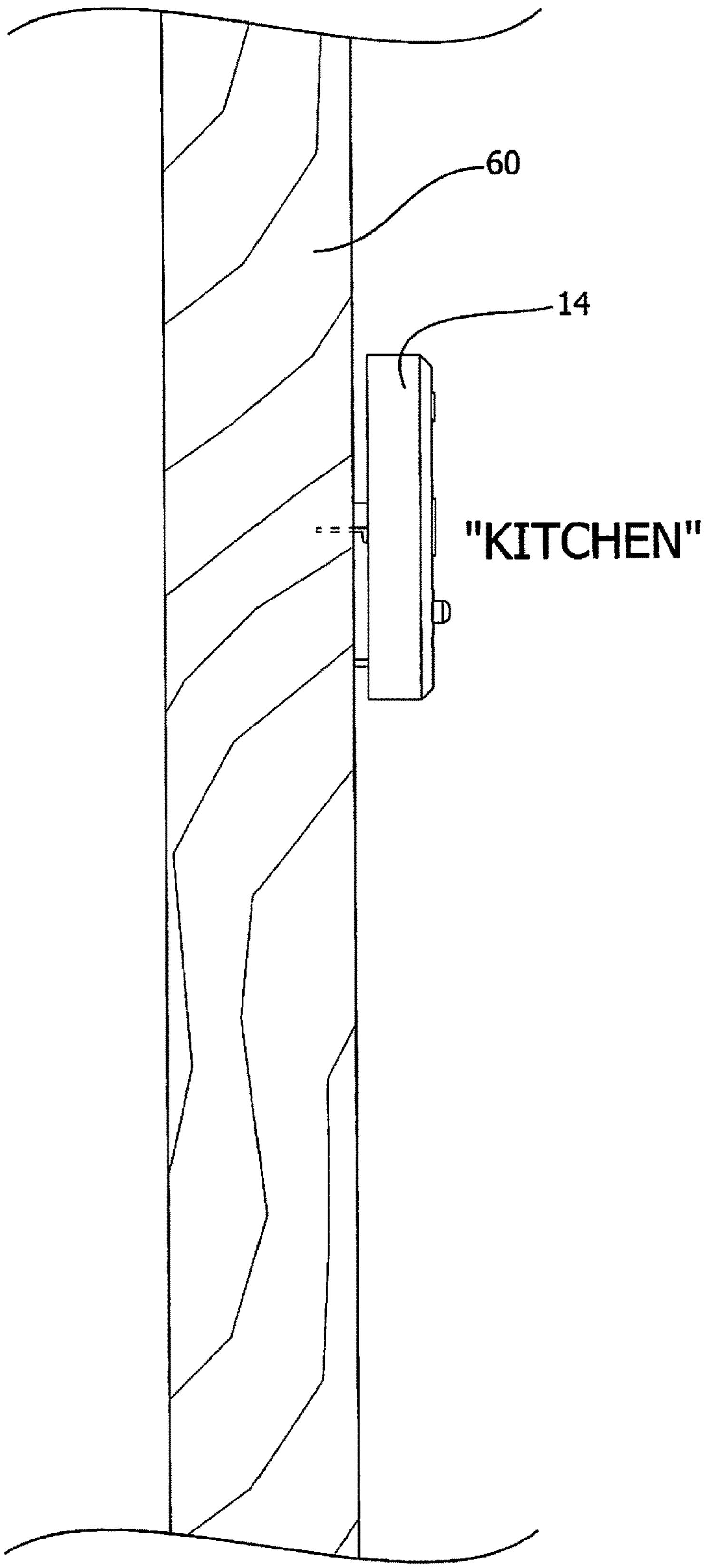
FIG. 3 is a side view of an embodiment of the disclosure in use.
Figure 4:
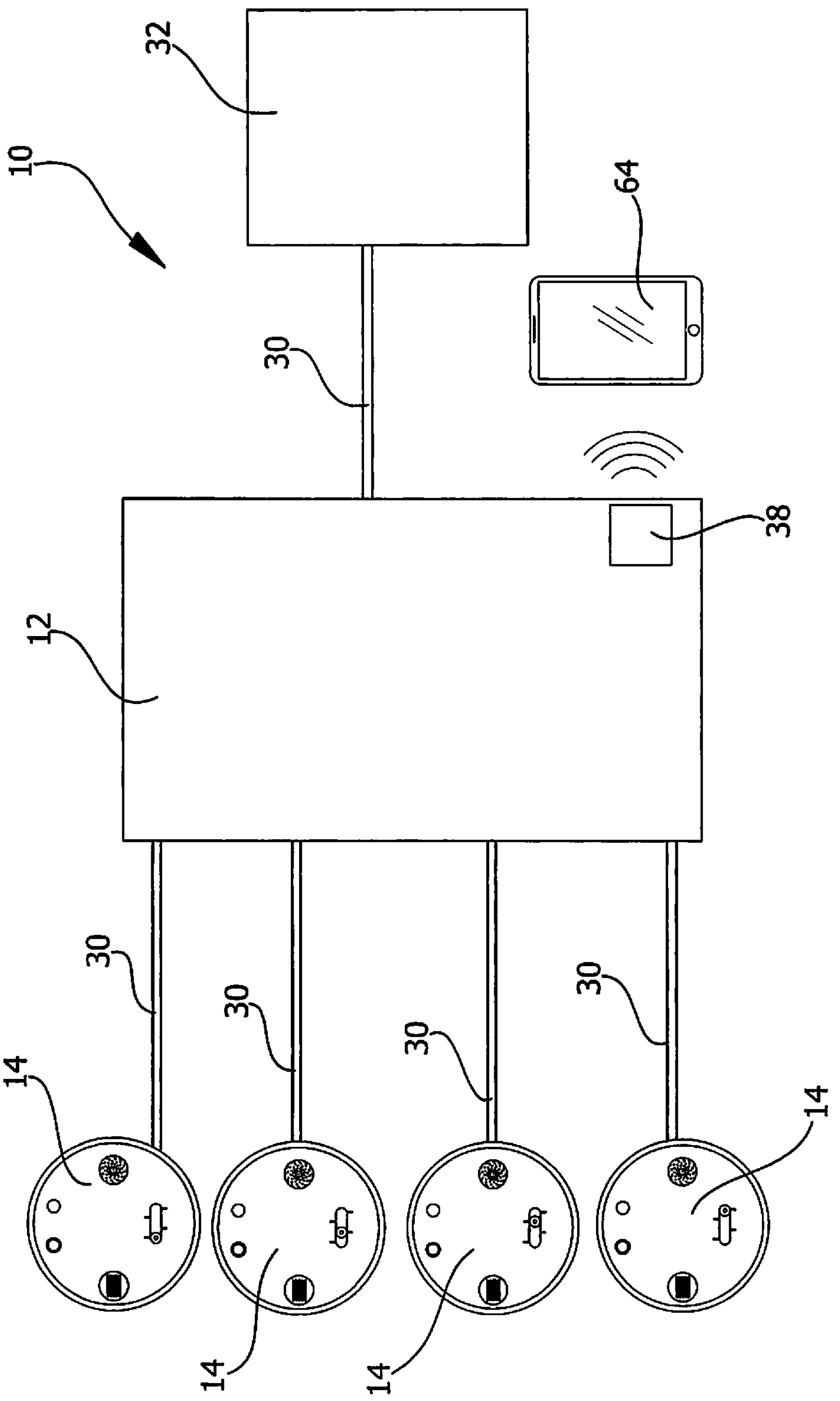
FIG. 4 is a schematic view of a location-indicating smoke detection arrangement according to an embodiment of the disclosure.

In accordance with at least one possible embodiment, the location-indicating smoke detection unit 14 may be used independent of the central control arrangement 12, such as is shown in FIG. 3. In this situation, the battery 24 supplies all the power. The operation is controlled solely by the processor 26. The room location switch 34 is included in order to program the location-indicating smoke detection unit 14 to emit the location message corresponding to the selected room type. All other components are the same as described above.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A location-indicating smoke detection arrangement comprising:

a plurality of location-indicating smoke location-indicating smoke detection units, each comprising a housing, a sensor, a light emitter, a reset switch, a battery, a processor, and a speaker;

a central control arrangement being operatively connected to said plurality of location-indicating smoke location-indicating smoke detection units to control the operation thereof;

said housing being configured to be mounted to a wall or ceiling;

said sensor being configured to detect smoke, carbon monoxide, or other hazardous gases;

said light emitter being configured to emit a light to indicate an operating status;

said reset switch being configured to test and reset the location-indicating smoke detection arrangement;

said battery being configured to supply power;

said processor being configured to process signals and activate components in response thereto;

said speaker being configured to emit sounds comprising:

an alarm sound upon a hazardous condition being detected in a room in which the location-indicating smoke detection arrangement is located;

a low-battery sound upon said battery being low or dead; and a location message upon said alarm sound or said low-battery sound being activated to inform persons of the room in which the location-indicating smoke detection arrangement is located; and wherein said central control arrangement is configured to activate all location-indicating smoke detection units to emit the same location message corresponding to an activated location-indicating smoke detection unit to inform persons in any location of a building in which room said activated location-indicating smoke detection unit is located.

2. The location-indicating smoke detection arrangement of claim 1, wherein said central control arrangement is programmable to permit a user to program in the different room locations for each of said plurality of location-indicating smoke location-indicating smoke detection units such that each of said plurality of location-indicating smoke location-indicating smoke detection units activates its corresponding location message upon said alarm sound or said low-battery sound being activated.

3. The location-indicating smoke detection arrangement of claim 2, wherein one of (A) and (B):

(A) said central control arrangement is connected to said plurality of location-indicating smoke location-indicating smoke detection units by a wired connection and is configured to supply power to said plurality of location-indicating smoke location-indicating smoke detection units, wherein said battery supplies backup power; and (B) said central control arrangement is connected to said plurality of location-indicating smoke location-indicating smoke detection units by a wireless connection.

4. The location-indicating smoke detection arrangement of claim 3, further comprising at least one alarm emitter operatively connected to said central control arrangement and configured to emit audiovisual alarm indicators including said alarm sound and said location message for persons in other rooms and persons with visual or auditory impairment.

5. The location-indicating smoke detection arrangement of claim 4, wherein each of said plurality of location-indicating smoke location-indicating smoke detection units further comprises a room location switch configured to be manually moved to select one of a plurality of common room types to program its corresponding location-indicating smoke location-indicating smoke detection unit to emit said location message corresponding to the selected room type in the event of power failure or disconnection from said central control arrangement.

6. The location-indicating smoke detection arrangement of claim 5, wherein said speaker is programmable to emit said low-battery sound at increasingly louder volumes over a period of time to ensure hearing by persons in other rooms or persons with auditory impairment.

7. The location-indicating smoke detection arrangement of claim 6, wherein said central control arrangement comprises a wireless transceiver to operatively connect said central control arrangement to a mobile electronic device or smartphone for both operation of the location-indicating smoke detection arrangement and communication of information to persons.

8. The location-indicating smoke detection arrangement of claim 7, wherein said light emitter comprises a multicolor LED arrangement configured to be controlled by said central control arrangement to emit lights of different colors at different intervals of time comprising at least one of: solid red light or fast flashing white or red light to indicate an emergency situation, solid yellow light or slow flashing red light to indicate a malfunction or low battery, and solid green light to indicate a good operating condition.

9. A location-indicating smoke detection arrangement comprising:

a plurality of location-indicating smoke location-indicating smoke detection units, each comprising a housing, a sensor, a light emitter, a reset switch, a battery, a processor, and a speaker;

a central control arrangement being operatively connected to said plurality of location-indicating smoke location-indicating smoke detection units to control the operation thereof;

said housing being configured to be mounted to a wall or ceiling;

said sensor being configured to detect smoke, carbon monoxide, or other hazardous gases;

said light emitter being configured to emit a light to indicate an operating status;

said reset switch being configured to test and reset the location-indicating smoke detection arrangement;

said battery being configured to supply power;

said processor being configured to process signals and activate components in response thereto;

said speaker being configured to emit sounds comprising:

an alarm sound upon a hazardous condition being detected in a room in which the location-indicating smoke detection arrangement is located;

a low-battery sound upon said battery being low or dead; and a location message upon said alarm sound or said low-battery sound being activated to inform persons of the room in which the location-indicating smoke detection arrangement is located; and wherein said central control arrangement is connected to said plurality of location-indicating smoke detection units by a wired connection and is configured to supply power to said plurality of location-indicating smoke detection units, wherein said battery supplies backup power.

10. The location-indicating smoke detection arrangement of claim 1, wherein said central control arrangement is connected to said plurality of location-indicating smoke detection units by a wireless connection.

11. The location-indicating smoke detection arrangement of claim 1, further comprising at least one alarm emitter operatively connected to said central control arrangement and configured to emit audiovisual alarm indicators including said alarm sound and said location message for persons in other rooms and persons with visual or auditory impairment.

12. A location-indicating smoke detection arrangement comprising:

a plurality of location-indicating smoke location-indicating smoke detection units, each comprising a housing, a sensor, a light emitter, a reset switch, a battery, a processor, and a speaker;

a central control arrangement being operatively connected to said plurality of location-indicating smoke location-indicating smoke detection units to control the operation thereof;

said housing being configured to be mounted to a wall or ceiling;

said sensor being configured to detect smoke, carbon monoxide, or other hazardous gases;

said light emitter being configured to emit a light to indicate an operating status;

said reset switch being configured to test and reset the location-indicating smoke detection arrangement;

said battery being configured to supply power;

said processor being configured to process signals and activate components in response thereto;

said speaker being configured to emit sounds comprising:

an alarm sound upon a hazardous condition being detected in a room in which the location-indicating smoke detection arrangement is located;

a low-battery sound upon said battery being low or dead; and a location message upon said alarm sound or said low-battery sound being activated to inform persons of the room in which the location-indicating smoke detection arrangement is located; and wherein each of said plurality of location-indicating smoke detection units further comprises a room location switch configured to be manually moved to select one of a plurality of common room types to program its corresponding location-indicating smoke detection unit to emit said location message corresponding to the selected room type in the event of power failure or disconnection from said central control arrangement.

13. A location-indicating smoke detection arrangement comprising:

a plurality of location-indicating smoke location-indicating smoke detection units, each comprising a housing, a sensor, a light emitter, a reset switch, a battery, a processor, and a speaker;

a central control arrangement being operatively connected to said plurality of location-indicating smoke location-indicating smoke detection units to control the operation thereof;

said housing being configured to be mounted to a wall or ceiling;

said sensor being configured to detect smoke, carbon monoxide, or other hazardous gases;

said light emitter being configured to emit a light to indicate an operating status;

said reset switch being configured to test and reset the location-indicating smoke detection arrangement;

said battery being configured to supply power;

said processor being configured to process signals and activate components in response thereto;

said speaker being configured to emit sounds comprising:

an alarm sound upon a hazardous condition being detected in a room in which the location-indicating smoke detection arrangement is located;

a low-battery sound upon said battery being low or dead; and a location message upon said alarm sound or said low-battery sound being activated to inform persons of the room in which the location-indicating smoke detection arrangement is located; and wherein said speaker is programmable to emit said low-battery sound at increasingly louder volumes over a period of time to ensure hearing by persons in other rooms or persons with auditory impairment.

14. The location-indicating smoke detection arrangement of claim 1, wherein said central control arrangement comprises a wireless transceiver to operatively connect said central control arrangement to a mobile electronic device or smartphone for both operation of the location-indicating smoke detection arrangement and communication of information to persons.

15. A location-indicating smoke detection arrangement comprising:

a plurality of location-indicating smoke location-indicating smoke detection units, each comprising a housing, a sensor, a light emitter, a reset switch, a battery, a processor, and a speaker;

a central control arrangement being operatively connected to said plurality of location-indicating smoke location-indicating smoke detection units to control the operation thereof;

said housing being configured to be mounted to a wall or ceiling;

said sensor being configured to detect smoke, carbon monoxide, or other hazardous gases;

said light emitter being configured to emit a light to indicate an operating status;

said reset switch being configured to test and reset the location-indicating smoke detection arrangement;

said battery being configured to supply power;

said processor being configured to process signals and activate components in response thereto;

said speaker being configured to emit sounds comprising:

an alarm sound upon a hazardous condition being detected in a room in which the location-indicating smoke detection arrangement is located;

a low-battery sound upon said battery being low or dead; and a location message upon said alarm sound or said low-battery sound being activated to inform persons of the room in which the location-indicating smoke detection arrangement is located; and wherein said light emitter comprises a multi-color LED arrangement configured to be controlled by said central control arrangement to emit lights of different colors at different intervals of time comprising at least one of: solid red light or fast flashing white or red light to indicate an emergency situation, solid yellow light or slow flashing red light to indicate a malfunction or low battery, and solid green light to indicate a good operating condition.

16. A location-indicating smoke location-indicating smoke detection unit comprising:

a housing being configured to be mounted to a wall or ceiling;

a sensor being configured to detect smoke, carbon monoxide, or other hazardous gases;

a light emitter being configured to emit a light to indicate an operating status;

a reset switch being configured to test and reset the location-indicating smoke detection arrangement;

a battery being configured to supply power;

a processor being configured to process signals and activate components in response thereto;

a room location switch configured to be manually moved to select one of a plurality of common room types to program said location-indicating smoke location-indicating smoke detection unit to emit a location message corresponding to the selected room type; and a speaker being configured to emit sounds comprising:

an alarm sound upon a hazardous condition being detected in a room in which the location-indicating smoke location-indicating smoke detection unit is located;

a low-battery sound upon said battery being low or dead; and the location message upon said alarm sound or said low-battery sound being activated to inform persons of the room in which the location-indicating smoke location-indicating smoke detection unit is located.

* * * * *